INVENTORS
JAMES P. O'BRIEN
ERNEST F. STACEY
BY ERNEST E. YEO

ATTORNEY

INVENTORS
JAMES P. O'BRIEN
ERNEST F. STACEY
ERNEST E. YEO
BY Lawrence Burns
ATTORNEY Dec. 8, 1959   J. P. O'BRIEN ET AL   2,916,056
LEAD-IN WIRE POSITIONING APPARATUS
Filed March 26, 1956   8 Sheets-Sheet 5

Fig. 8

INVENTORS
JAMES P. O'BRIEN
ERNEST F. STACEY
BY ERNEST E. YEO

Lawrence Brown
ATTORNEY

Dec. 8, 1959    J. P. O'BRIEN ET AL    2,916,056
LEAD-IN WIRE POSITIONING APPARATUS
Filed March 26, 1956    8 Sheets-Sheet 7

Fig. 10

INVENTORS
JAMES P. O'BRIEN
ERNEST F. STACEY
BY  ERNEST F. YEO

ATTORNEY

United States Patent Office 2,916,056
Patented Dec. 8, 1959

2,916,056

LEAD-IN WIRE POSITIONING APPARATUS

James P. O'Brien and Ernest F. Stacey, Beverly, and Ernest E. Yeo, Wenham, Mass., assignors, by mesne assignments, to Sylvania Electric Products Inc., Wilmington, Del., a corporation of Delaware Application March 26, 1956, Serial No. 573,884

4 Claims. (Cl. 140—71.5)

This invention relates generally to lamp-making machinery and more particularly to apparatus employed for positioning lead-in wires of electric lamps during their manufacture.

Apparatus according to our invention is particularly useful in an exhaust machine, which generally comprises an intermittently movable turret for exhausting a plurality of electric lamps while carrying them through a succession of stations. In such a machine, the lamp is successively evacuated, flushed, filled with inert gas and its exhaust tube hermetically sealed as a final step. Sealing or "tipping off" of the exhaust tube is affected by a so-called "tipping-torch" which is directed to a portion of the exhaust tube for rendering it plastic and allowing it to be collapsed by atmospheric pressure. As the lamp is inserted into the machine, a pair of lead-in wires, each in electrical communication with an end of the lamp's filament, is disposed in juxtaposition with the exhaust tube.

In addition, our invention is more particularly directed to the solution of problems which arise in coordinating the operation of an exhaust machine with that of a basing machine. Heretofore basing machines have been operated independently of exhaust machinery. In such independent operation, one of the lead-in wires of the lamp is hand-threaded through the central eyelet of the lamp base as the lamp is loaded manually into the basing machine. In order to improve the efficiency of lamp-making operations, it is highly desirable that the operation of a basing machine be coordinated with that of an exhaust machine by providing automatic lamp transfer and threading of a lead-in wire through the central eyelet of the base. Each of the two lead-in wires is generally to be connected to a different type of contact; one is intended to be connected to the center eyelet of a lamp base; while the other is to be connected to the outside shell of a base. The eventual connection of the lead-in wires is greatly facilitated by positioning each of them in a pre-determined orientation at the time that the wires are displaced from the exhaust tube preparatory to tipping-off the lamp.

The necessity for proper orientation is especially necessary when one of the lead-in wires is a fuse, because the fuse wire is most effective when connected to a particular contact, for example, to the open end of the shell if the base is attached to the lamp by cement inside said end.

Accordingly a general object of our invention is to increase the efficiency with which lamp making processes are effected, and another object is to provide improved apparatus for displacing the lead-in wires of electric lamps preparatory to tipping off the lamp. A further object is to provide apparatus which positions each wire in a pre-determined orientation.

These and other objects are achieved in accordance with our invention by a combination of two mechanisms, located at successive work stations, on an exhaust machine having a turret for moving an electric lamp intermittently to these stations. The first mechanism employs a pair of spaced flexible fingers each of which is inserted between a lead-in wire and the exhaust tube. The distance between the fingers is thereafter increased for pre-positioning the wires away from the tube. The mechanism at a subsequent station includes a guide which urges one of the wires outwardly from the center of the turret while a finger is introduced between the other wire and the exhaust tube. Thereafter a wire-wiping motion is imparted to the finger for positioning its related wire in a pre-determined orientation and the outwardly urged wire is engaged by a wire positioner, which is also a part of the second mechanism, and bent thereby in a direction substantially normal to that of the other wire.

Further objects, advantages and novel features of our invention will become apparent from the following description of an illustrative embodiment thereof taken in connection with the accompanying drawings in which.

Figure 1:
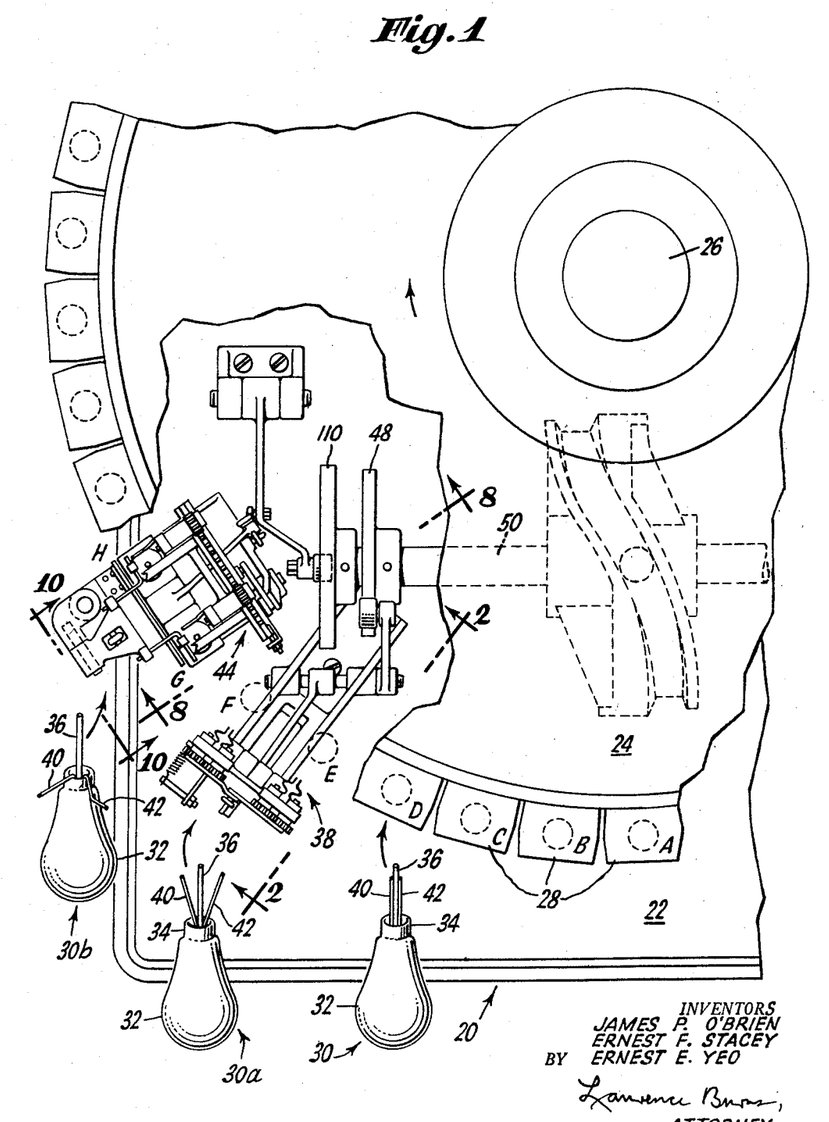
Figure 1 is a plan view of our apparatus shown in conjunction with a lamp exhaust machine.

Turning now to the drawings, and particularly to Figure 1, we will now describe an illustrative embodiment of our invention associated with an exhaust machine indicated at 20. The machine 20 includes a base 22 and a turret 24 having an intermittent motion about the axis of shaft 26. A plurality of exhaust heads 28 are mounted at the periphery of the turret 24 and carried thereby to a plurality of work stations some of which have been identified for clearness of reference by letters A through H. The turret 24 is provided with a double index motion, that is, the heads 28 are moved each time through an arc equal to the angular separation between alternate heads. It will thus be understood that while a head 28 is moved successively to stations A, C, E, G, etc., an adjacent head is simultaneously moved to stations B, D, F, H, etc.

Each of the heads 28 is adapted to carrying a lamp indicated at 30 and comprising a glass envelope or bulb 32 which encloses a filament, not shown, and has a neck portion 34, formed to receive a lamp base at a subsequent operation. Each lamp 30 is carried by its exhaust tube 36 which is inserted into an exhaust head 28. Before the lamp 30 is operated upon by a first mechanism indicated at 38, lead-in wires 40 and 42 are disposed in juxtaposition with the tube 36, generally in a plane which is tangent to the path of motion of the lamp. The wire 40, called the "eyelet wire" is of copper and is thereafter connected to the central eyelet of the lamp base. The wire 42 called the "side wire" is connected to the side of the base at the basing operation and typically serves as a current limiting fuse.

Positioning of the wires 40, 42 is accomplished by our apparatus in two steps. The first of these steps is performed simultaneously on the lead-in wires 40, 42 of each of the two lamps 30 at stations E and F. The mechanism 38 at these stations engages the wires 40, 42 of each lamp and displaces them away from the exhaust tube 36 as a preliminary step to final positioning. Disposition of the wires 40, 42 is best shown in a lamp indicated at 30a adjacent the mechanism 38. The lamps 30a are indexed to stations G and H where a second mechanism indicated at 44 operates on the wires 40, 42. The mechanism 44 positions the eyelet wire 40 generally ahead of the tube 36 and normal to it. On the other hand the side wire 42 is wiped along the neck 34 and then outwardly from the center of the turret 24 as indicated at 30b.

Figures 2, 3:
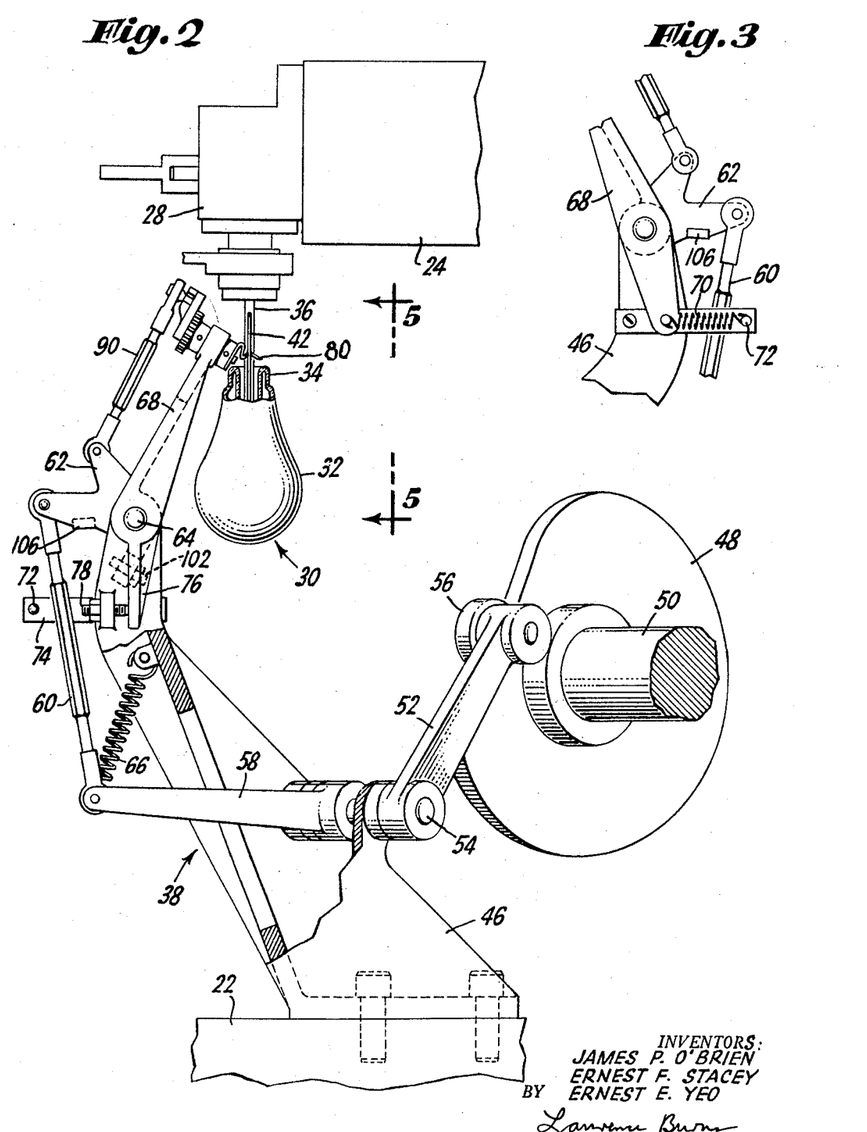
Figure 2 is a view in side elevation taken along the line 2—2 of Figure 1 and showing a first mechanism included in our apparatus for displacing the lead-in wires from the exhaust tube.
Figure 3 is a fragmentary view in side elevation showing a portion of the side opposite that shown in Figure 2.
Figure 4:
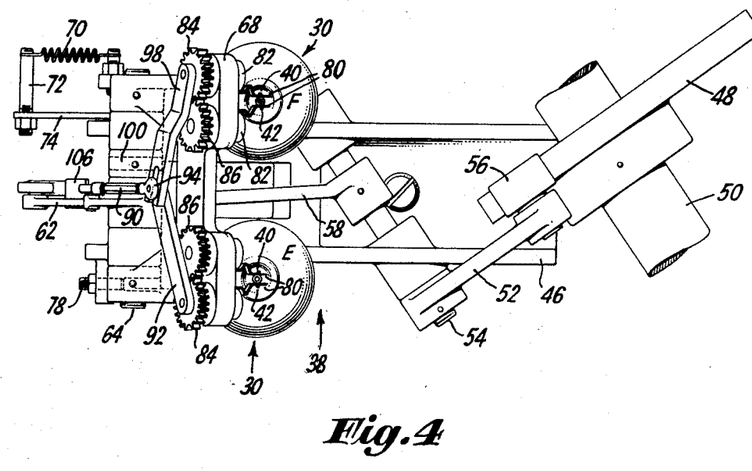
Figure 4 is a plan view, in enlarged scale, of the first mechanism.

We will now describe in detail the mechanism 38 with reference to Figures 2–4. The mechanism 38 is mounted on a pedestal 46, fixedly upstanding on the machine base 22, and is actuated by a cam 48 fixed to shaft 50 for rotation therewith. The shaft 50 makes one revolution for each indexing motion of the turret. A lever 52 is fixed at one end to pivoted shaft 54 and carries, at its free end, a cam follower 56 maintained in contact with the cam 48. An arm 58 has one end fixedly connected to the shaft 54 and is pivotally connected at the other to the lower end of a generally vertically disposed link rod 60. At its upper end, the rod 60 is pivoted to a bell-crank 62 which is free to oscillate on a shaft 64 journalled in the upper portion of the pedestal 46. The arm 58 is biased in a clockwise direction, as seen in Figure 2, by a spring 66 held under tension between the free end of the arm and a suitable anchor on the pedestal 46.

A yoke 68 is fixed on the shaft 64 for pivotal motion about the axis of the shaft and supports wire forming parts of the mechanism 38. The yoke 68 is biased in a clockwise direction, as seen in Figure 2, by a tension spring 70, shown in Figures 3 and 4, mounted between the lower end of the yoke and a stud 72, extending outwardly from a bar 74 fixed to the pedestal 46. A depending extension 76, integral with the yoke 68 engages a screw 78 which serves as an adjustably fixed stop for the inward movement of the upper end of the yoke 68 under the bias of the spring 70. In the inward position of the yoke 68, a flexible finger 80 is inserted between the exhaust tube 36 and each of the wires 40, 42 of each lamp 30.

Figure 5:
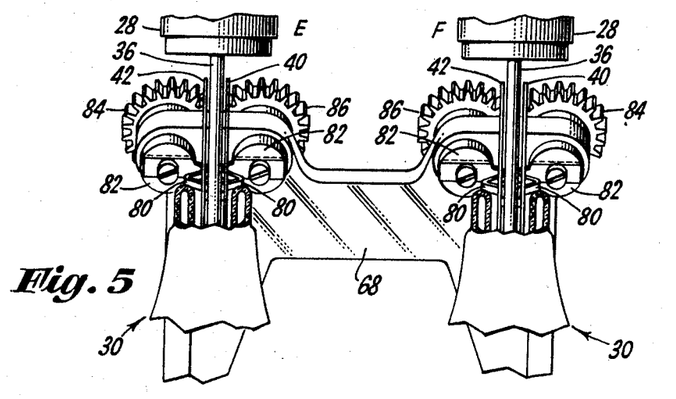
Figure 5 is a fragmentary view taken along the line 5—5 of Figure 2 which shows fingers of the first mechanism engaging the lead-in wires adjacent the exhaust tube.

A pair of fingers 80 operates on the wires 40, 42 of each of the lamps 30 at the stations E and F. Each finger 80 is fixed on the inner end of a headed shaft 82 for pivotal motion about the axis of the related shaft which is journalled in the yoke 68 as shown more particularly in Figures 4–6. Actuation of each pair of fingers 80 is effected through a driver gear 84 mounted on the outer end of one of the shafts 82 in mesh with a driven gear 86 similarly mounted on its shaft 82. Motion is supplied to the drivers 84 through a link rod 90 which is pivotally connected at one end to the bell-crank 62. A lever 92 fixed to shaft 82, on which the driver 84 at station E is mounted, carries, at its free end, a stud 94 to which the rod 90 is also pivotally connected. The stud 94 is engaged by a slot 96 in off-set lever 98 which is fixed to the shaft 82 on which the driver gear 84 at station F is mounted. This gear and lever arrangement translates a reciprocating motion of the rod 90 into an oscillating movement of the fingers 80, each about the axis of its related shaft 82.

Figure 6:
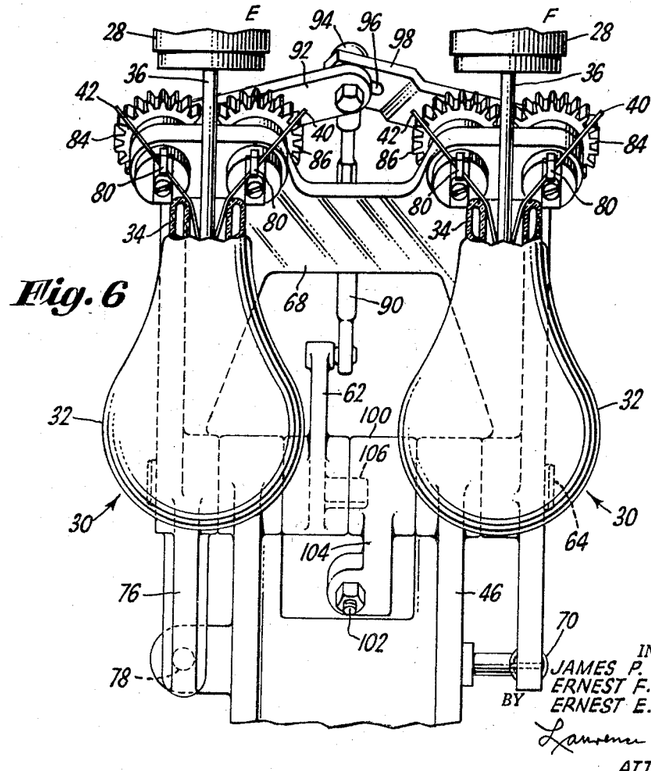
Figure 6 is a fragmentary view of the mechanism shown in Figure 5 at the end of a lead-in wire displacing operation.

Movement of the fingers 80 inwardly into engagement with the wires 40, 42 and outwardly to a retracted position is also effected through the bell-crank 62. A collar 100 fixed to the shaft 64 as shown in Figures 4 and 6 carries a screw 102 in an integral arm 104. The screw 102 is positioned to be engaged by a projecting member 106, integral with the crank 62.

Figure 8:
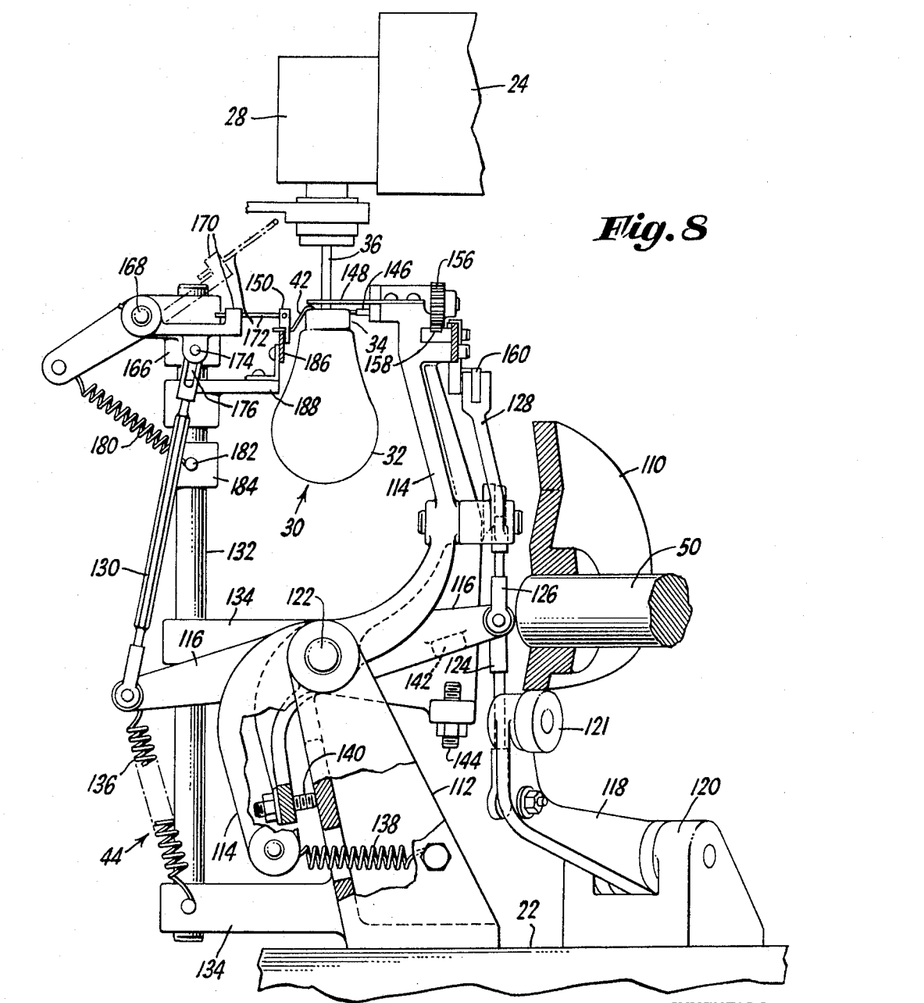
Figure 8 is a view in side elevation taken along the line 8—8 of Figure 1 and showing a second mechanism included in our apparatus, for positioning the lead-in wires.
Figure 9:
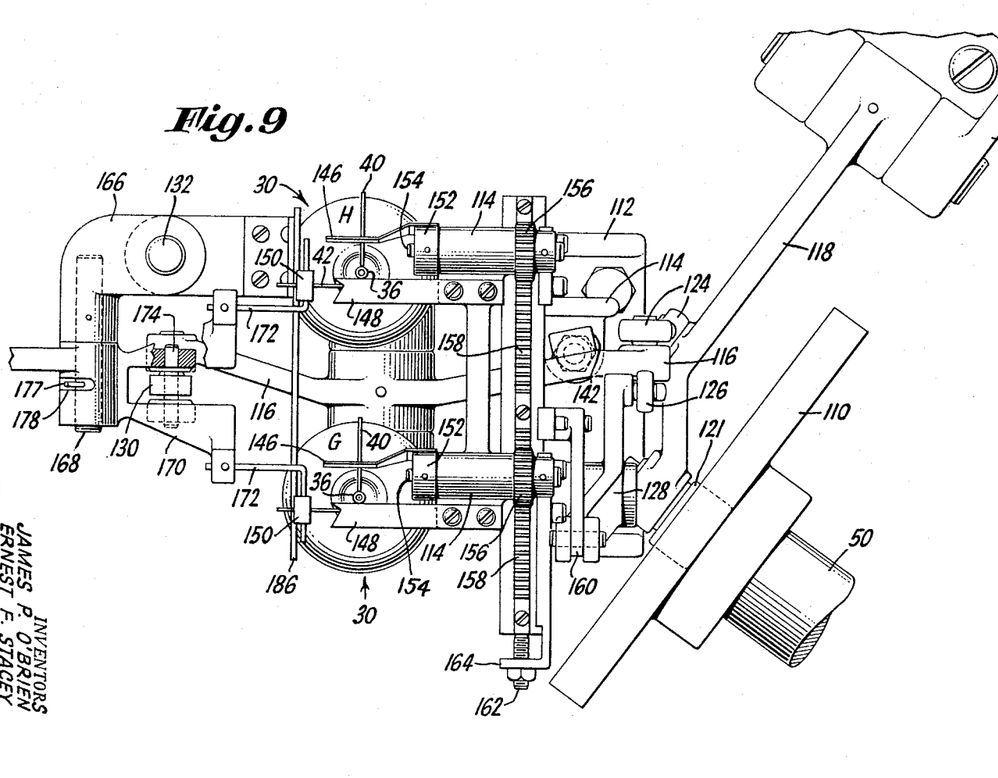
Figure 9 is a plan view, to an enlarged scale, of the second mechanism.

With initial reference to Figures 1, 8 and 9, we will now describe the positioner mechanism 44 shown at stations G and H for placing the wires in correct orientation for subsequent operations. The mechanism 44 is operated by a cam 110 fixed to the shaft 50 adjacent the cam 48. The mechanism 44 generally comprises a base 112 fixed on the machine base 22, a yoke 114 and a lever 116 pivotally mounted on the base 112. A follower arm 118, pivoted at one end on a block 120 upstanding on the base 22 carries at its free end a follower roll 121 which is maintained in contact with the cam 110. The yoke 114 is pinned to a shaft 122 which is journalled in the upper portion of the base 112 and the lever 116 is pivotally mounted on the shaft 122.

The lever 116 is actuated from the follower arm 118 by a link rod 124 which is pivoted at one end on the arm 118 and, at the other, to the inward end, with respect to the turret 24, of the lever 116. Also pivotally connected to the inner end of the lever 116 is one end of a link rod 126 which actuates a bell crank 128, best shown in Figure 10. At its outer end, the lever 116 carries pivotally connected thereto a generally vertical link rod 130. A post 132 mounted in a pair of outwardly extending brackets 134 formed integral with the base 112 supports outwardly disposed wire positioning tools. The lever 116 is biased in a counter clockwise direction as shown in Figure 8 by a tension spring 136 connected to the outer end thereof and anchored to the lower bracket 134. The yoke 114 is similarly biased by a spring 138 held under tension between a lower extension of the yoke 114 and the base 112. An adjustable stop screw 140 is provided in the lower extension of the yoke 114 for limiting the counter clockwise motion thereof by contact with the base 112. A projection 142, integral with the lever 116, engages a set screw 144 adjustably fixed in the yoke 114 for regulating the motion of the latter.

At its upper end, the yoke 114, which is shown in operative position in Figure 8, carries a movable finger 146 for positioning the eyelet wire 40 of each lamp 30. In addition, a notched rigid guide 148 is provided at each station for urging the side wire 42 outwardly into position to be engaged by positioner block 150. Each finger 146 is fixed by means of a collar 152 to a shaft 154 journalled in the yoke 114. A pinion 156 is pinned on each shaft 154 and is in toothed engagement with a slidably mounted rack 158. Reciprocating motion is transmitted from the crank 128, which is pivoted on the yoke 114, by means of a connecting link 160. The lateral reciprocating motion of the rack 158 and the consequent oscillatory movement of the shafts 154 is limited by a stop screw 162 adjustable in a bracket 164.

Another part of the mechanism 44 which cooperates with the guides 148 for positioning the wire 42 of each lamp 30 will now be more particularly described and includes a bracket 166 fixed to the post 132. A shaft 168 is pinned in the bracket 166 and serves as a fulcrum for a lever 170 which carries the blocks 150, each on its support 172. The lever 170 is actuated through a stud 174 which is engaged by a slot 176 in the upper end of the rod 130. A pin 177, best seen in Figure 9, is fixed to the shaft 168 and is engaged by a slot 178 in the lever 170 for limiting counter clockwise movement of the latter to approximately the position shown in phantom in Figure 8. Such movement is provided by a spring 180 under tension between the lever 170 and an anchor stud 182 on collar 184 fixed to the post 132. A wire form bar 186, positioned to cooperate with both blocks 150 is supported on a bracket 188 fixed to the post 132.

We will now describe the operation of the first mechanism with initial reference to Figures 2 and 4. At the end of an indexing motion of the turret 24, the yoke 68 is operated in a clockwise direction as shown in Figure 2 to bring the fingers 80 into engagement with the wires 40, 42. Until the end of the turret index motion, the yoke 68 is maintained in its retracted position by the cam 48 which revolves the levers 52 and 58 to their farthest counter-clockwise position against the bias of the spring 66. The rod 60 is then in its most downward position and the crank 62 is revolved to the counter-clockwise extreme of its motion; the member 106 is in engagement with the screw 102 for revolving the shaft 64 and the yoke 68 to their counter-clockwise extreme against the bias of the spring 70, shown in Figure 3.

At the end of the turret index motion, the lever 52 and the arm 58 are allowed to pivot in a clockwise direction by the cam 48 and the rod 60 thereby to move upwardly. As the rod 60 moves upwardly, the resultant clockwise motion of the crank 62 is transmitted to the yoke 68 until the wires 40, 42 have been fully engaged by the fingers 80. During the motion of the yoke 68, the screw 102 is maintained in engagement with the member 106 by the bias of the spring 70. When the extension 76 contacts the screw 78, the motion of the yoke 68 is arrested. During the time interval that the yoke 68 is in motion, there is no relative movement between the rod 90 and the yoke and hence no pivotal motion of the fingers 80.

Figure 7:
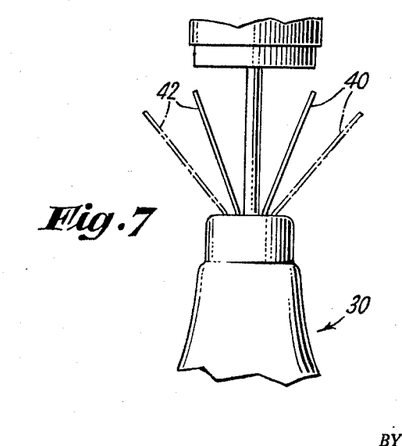
Figure 7 is a fragmentary view of a lamp showing positions assumed by the lead-in wires at the first mechanism.

In order to pick up the wires 40, 42, which are juxtaposed with the tube 36 in a plane generally normal to the line of motion of the yoke 68, the fingers 80 of each pair are spaced apart a distance which is somewhat less than the diameter of the tube 36. The tips of the fingers 80 thus engage the tube 36 with a wiping action, being deflected by the tube to the position shown in Figures 4 and 5. Pivotal motion is thereafter imparted to the fingers 80 by the continuing movement of the crank 62 after the extension 76 has engaged the screws 78 (Fig. 2) and the yoke 68 has thereby been stopped at the clockwise extreme of its travel. Motion of the rod 90 in an upward direction to the position shown in Fig. 6 is translated by the levers 92 and 98 into pivotal movement of the related fingers 80 upward and away from the tubes 26, each through an arc of approximately 90°. The wires 40, 42 are bent outwardly by the fingers 80 to approximately the positions shown in phantom in Figure 7. The resilience of the wires 40, 42 causes them to return to an intermediate position shown in solid lines in the same figure.

The cam 48 is formed with a lobe for shortly thereafter moving the lever 52 and the arm 58 in a counterclockwise direction, as shown in Figure 2. During the initial part of the motion of the arm 58, the extension 76 is retained in contact with the screw 78 by the spring 70. The movement of the lever 58 is translated by the rod 60 and the crank 62 for returning the fingers 80 to a closely spaced relationship. With the continuing downward motion of the rod 60, as shown in Figure 2, the member 106 engages the screw 102 and thereby effects a retraction of the upper portion of the yoke 68 to its most outward position. After the yoke 68 has been moved a sufficient distance outwardly so that the fingers 80 clear the tube 36, the next indexing motion of the turret 24 may start. The yoke 68 remains in the farthest outward position until the beginning of the mechanism's next operating cycle.

The operation of the mechanism 44 will best be understood from a description of positions assumed by the component parts of the mechanism during an operative cycle commencing as the lamps 30 arrive at the wire positioning stations G and H. At that time, the arm 118 is revolved in a counter clockwise direction from the position shown in Figure 8 by engagement of its follower 121 with the cam 110 and the lever 116 is accordingly revolved to the clockwise limit of its motion. The projection 142 on the lever 116 is then in engagement with the screw 144 on the yoke 114 thereby withdrawing the latter, against the bias of the spring 138, from its operative position shown in Figure 8 to a retracted position fragmentarily illustrated in Figure 11. Since the lever 116 is at its clockwise limit, the rod 130 is in its uppermost position and the lever 170 is accordingly permitted to assume a retracted position, shown in Figure 11. During this interval, the stud 174 is disposed in the lower end of the slot 172 in the rod 130 and the clockwise end of the slot 178 in the lever 170 is maintained in engagement with the pin 177 by the bias of the spring 180.

After the arrival of the lamps 30 at stations G and H, the mechanism 44 is actuated by continuing rotation of the cam 110 which permits the lever 116 to pivot in a counterclockwise direction. This pivotal motion of the lever 116 under the tension of the spring 136 allows the yoke 114 to move into operative position under the urging of the spring 138. During the motion of the yoke 114, the screw 144 thereon remains in engagement with the projection 142 on the lever 116. At each of the stations G and H, a lamp 30 is positioned with its exhaust tube 36 partially in the path of the guide 148. The free end of the guide 148 which is relatively rigid accordingly displaces the tube 36 to one side as the guide moves into operative position. At the same time the finger 146 yieldingly engages a generally opposite portion of the tube 36 with a wire wiping action. As a result of the engagement of the tube 36 by the guide 148 and the finger 146 wires 40, 42 which have remained close to the tube are easily picked up. The motion of the yoke 114 is arrested by contact of the screw 140 with the base 112.

Figures 11, 12, 13, 14, 15:
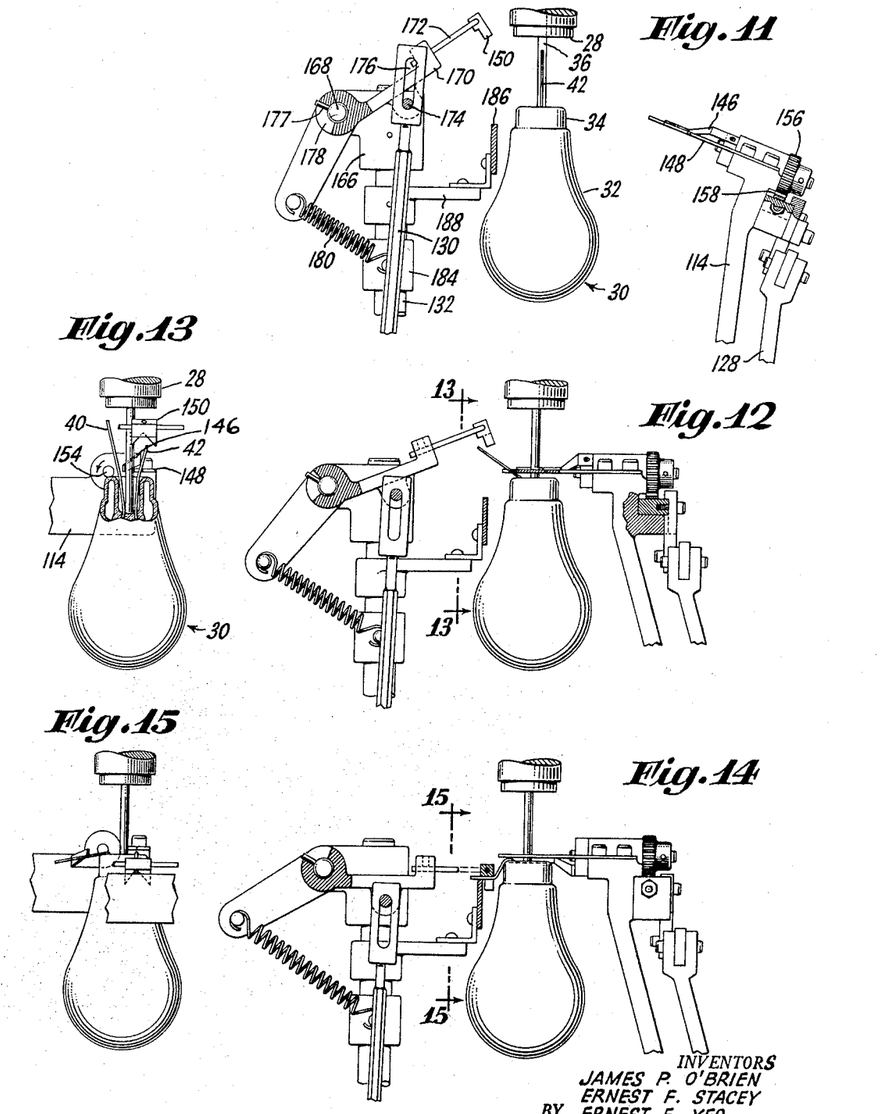
Figure 11 is a fragmentary view in side elevation showing relative disposition of component parts of the second mechanism as a lamp arrives at the work station.
Figure 12 is a fragmentary view in side elevation showing a lamp's lead-in wires engaged by a first part of the second mechanism.
Figure 13 is a fragmentary view in end elevation taken along the line 13—13 of Figure 12.
Figure 14 is a fragmentary view in side elevation showing the lamp's lead-in wires being finally positioned by the second mechanism.
Figure 15 is a fragmentary view in end elevation taken along the line 15—15 of Figure 14.

The disposition of parts at this point in the operating cycle may be seen in Figures 12 and 13. In these views only one lamp 30 is shown but it will be understood that the action of the mechanism 44 is the same at stations G and H. At the end of the stroke of the yoke 114, the guide 148 and the finger 146 are fully engaged. Since there is no relative motion between the crank 128 and the yoke 114 during the stroke, the finger 146 is disposed in a generally vertical plane in its unactuated position. The lever 170 has just begun to move, prior motion of the lever 116, and hence of the rod 130, having been taken up in moving the upper end of the slot 176 down to engage the stud 174.

Figure 10:
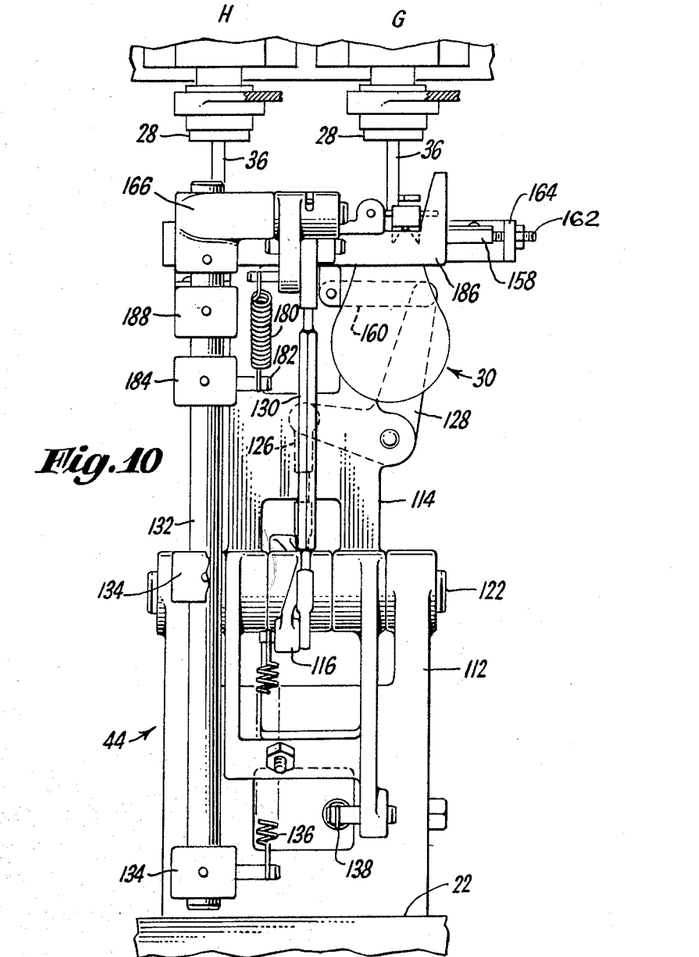
Figure 10 is a view in end elevation of the second mechanism taken along the line 10—10 of Figure 1.

After the stud 140 has contacted the base 112 to arrest the motion of the yoke 114, the cam 110 continues to impart a counter clockwise pivoting motion to the lever 116. The rod 126 is thus caused to move upwardly as shown in Figure 8. The upward motion of the rod 126 results in a pivotal movement of the crank 128 in a clockwise direction as shown in Figure 10. This movement of the crank 128 is coupled to the rack toothed slide 158 by means of the link 160 for moving the slide 158 to the position shown in Figures 9 and 10, in contact with the stop screw 162. This motion of the slide 158 affects a pivotal movement of the finger 146 from a position adjacent the tube 36 as shown in Figure 13, somewhat more than ¼ turn about the shaft 154 to the wire bending position shown in Figure 15.

The side wire 42 of each lamp 30 is displaced radially outwardly of the turret 24 by the related guide 148 before the motion of the yoke 114 is stopped. Thereafter the wire 42 is engaged by a block 150 and bent to its final position during the time interval in which the eyelet wire 40 is positioned by the finger 146. During the motion of the yoke 114, there is little if any motion of the lever 170, the movement of the rod 130 being taken up by a lost motion arrangement consisting of the slot 176 and the stud 174. When the yoke 114 stops moving, continuing movement of the rod 130, the top of whose slot 176 is now engaged by the stud 174, effects a pivoting of the block 150 into engagement with the wire 42. The block 150 moves downwardly against the wire 42 until the bar 186 is encountered. As shown in Figures 14, 15, and at 30b of Figure 1, the wire 42 is thus placed, by the above means, adjacent to the neck 34 of the lamp 30 and its excess length is offset outwardly for ease of trimming after the lamp is based.

After positioning of the wires 40, 42 has been accomplished, the mechanism 44 is returned to its inactive position. Return movement is effected by the cam 110 which causes the arm 118 to pivot in a counter-clockwise direction, as shown in Figure 8. The pivotal motion of arm 118 is coupled by the rod 124 to the lever 116 which is correspondingly pivoted against the tension of the spring 136. The rod 130 is moved upwardly to permit the lever 170 to return under the bias of the spring 180 to the position shown in phantom in Figure 8. At the same time the rod 126 moves downwardly thereby imparting, to the crank 128, a counter clockwise pivotal movement as shown in Figure 10. This movement of the crank 128 is coupled to the slide 158 by the link 160 causing the slide to move to the left away from the stop screw 162 as shown in Figure 10 and thereby returns each of the fingers 146 to a position adjacent its related exhaust tube 36. During the initial portion of the return movement of the mechanism, which has already been described, no motion of the yoke 114 is effected. Relative positions of wire positioning parts of the mechanism 44 are as illustrated in Figures 12 and 13 at this point in the operating cycle.

Thereafter the projection 142 on the lever 116 contacts the screw 144 on the yoke 114. By continuing clockwise motion of the lever 116, the yoke 114 is retracted to the clockwise extreme of its travel. As soon as the guides 148 and the fingers 146 have moved out of engagement with the exhaust tubes 36, the indexing motion of the turret 24 may begin insofar as the mechanism 44 is concerned. The yoke 114 is retained in the position shown in Figure 11 until the arrival of other lamps at stations G and H, at which time another operative cycle begins.

What we claim is:

1. In a lamp-making machine provided with a carrier having a head for indexing a lamp held by said head to a succession of work stations, said lamp having an exhaust tube and a pair of lead-in wires extending in juxtaposition with said tube, the combination of: means at one of said stations for displacing said wires away from said tube; means for actuating said wire displacing means; a movable guide disposed at a subsequent station; means for moving said guide across the path of said indexing motion, into engagement with one of said wires to urge the same in the direction of motion of said guide; a wire bending means for thereafter orienting said one of said wires; means for actuating said wire bending means; a finger also disposed at said subsequent station; means for introducing said finger between the exhaust tube and the other of said wires; and means for thereafter imparting to said finger a wire-wiping motion whereby said other of said wires is positioned in pre-determined orientation relative to said first mentioned wire.

2. In a lamp-making machine provided with a carrier having a head for indexing a lamp held by said head to a succession of work stations, said lamp having an exhaust tube and a pair of lead-in wires extending in juxtaposition with said tube, the combination of: a pair of initially spaced movable fingers disposed at one of said stations; means for introducing each of said fingers between said tube and one of said wires; means for thereafter spreading said fingers apart to pre-position said wires in spaced relationship with said tube; a movable guide disposed at a subsequent station; means for moving said guide across the path of said indexing motion into engagement with one of said wires to urge the same in the direction of motion of said guide; a wire bending means for thereafter orienting said one of said wires; means for actuating said wire bending means; a finger also disposed at said subsequent station; means for introducing said finger between the exhaust tube and the other of said wires; and means for thereafter imparting to said finger a wire-wiping motion whereby said other of said wires is positioned in pre-determined orientation relative to said first-mentioned wire.

3. In a lamp-making machine provided with a carrier having a head for indexing a lamp held by said head through a closed path to a succession of work stations, said lamp having a side wire and an eyelet wire extending in juxtaposition with an exhaust tube, the combination of: means at one of said stations for displacing said wires away from said tube; means for actuating said wire displacing means; a movable yoke disposed inside said path at a subsequent station; a guide fixed on said yoke; a finger pivotably mounted on said yoke; means for moving said yoke toward said path to introduce said finger between said eyelet wire and said tube at the same time that said side wire is engaged by said guide and urged thereby outwardly of said path; means for thereafter pivoting said finger to position said eyelet wire in a direction generally normal to the direction of motion of said yoke; movable wire bending means disposed outside said path for engaging said outwardly urged side wire to position the same in pre-determined orientation relative to said eyelet wire; and means for actuating said wire bending means.

4. In a lamp-making machine provided with a carrier having a head for indexing a lamp held by said head through a closed path to a succession of work stations, said lamp having a side wire and an eyelet wire extending in juxtaposition with an exhaust tube, the combination of: a first movable yoke disposed at one of said stations within said path; a pair of flexible fingers pivotably mounted on said yoke; means for moving said yoke toward said path to introduce said fingers each between one of said wires and said tube; means for thereafter pivoting said fingers away from said tube to pre-position said wires in spaced relationship with said tube; a second movable yoke disposed inside said path at a subsequent station; a guide fixed on said second yoke; a finger pivotably mounted on said second yoke; means for moving said second yoke toward said path to introduce said finger between said eyelet wire and said tube at the same time that said side wire is engaged by said guide and urged thereby outwardly of said path; means for thereafter pivoting said finger to position said eyelet wire in a direction generally normal to the direction of motion of said second yoke; movable wire bending means disposed outside said path for engaging said outwardly urged side wire to position the same in pre-determined orientation relative to said eyelet wire; and means for actuating said wire bending means.

References Cited in the file of this patent

UNITED STATES PATENTS

| | | |
|---|---|---|
| 1,821,894 | Otaka | Sept. 1, 1931 |
| 2,297,950 | Flaws | Oct. 6, 1942 |
| 2,554,013 | Cooper | May 22, 1951 |
| 2,650,634 | Young | Sept. 1, 1953 |
| 2,653,631 | Vaughn | Sept. 29, 1953 |
| 2,721,584 | Midgley | Oct. 25, 1955 |
| 2,765,002 | Reynolds | Oct. 2, 1956 |